Jan. 5, 1971 W. H. SCHIESSER 3,551,951
MULTIPLE EXTRUDER HEAD FOR EXTRUDERS
Filed March 12, 1968 2 Sheets-Sheet 1

INVENTOR.
Walter Hugo Schiesser
BY
Avon Broudy
attorney

Jan. 5, 1971 W. H. SCHIESSER 3,551,951
MULTIPLE EXTRUDER HEAD FOR EXTRUDERS
Filed March 12, 1968 2 Sheets-Sheet 2
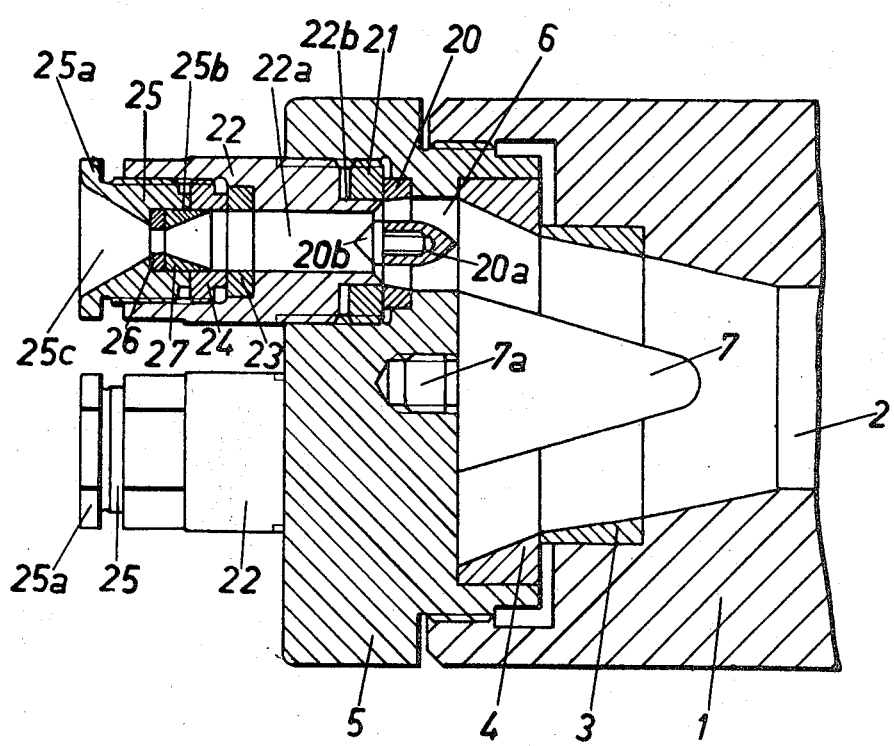
Fig.4
Fig.5
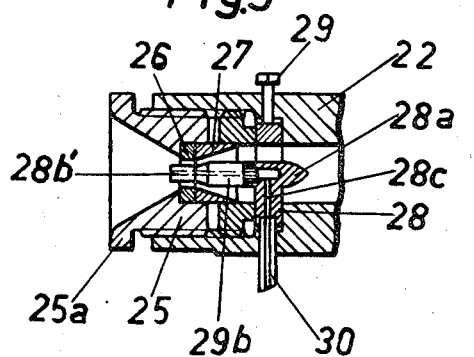

United States Patent Office 3,551,951
Patented Jan. 5, 1971

3,551,951
MULTIPLE EXTRUDER HEAD FOR EXTRUDERS
Walter Hugo Schiesser, 9 Hortensienstrasse,
CH 8050 Zurich, Switzerland
Filed Mar. 12, 1968, Ser. No. 712,466
Int. Cl. B29f 3/06
U.S. Cl. 18—12                              5 Claims

ABSTRACT OF THE DISCLOSURE

The application discloses a multiple extruding die for extruders in which a supporting member is mounted on the nozzle of the extruder; the member contains 2 or more axially parallel ducts over which the effluent molding composition from the nozzle of the extruder is distributed by a guide member; and an outlet nozzle containing an extrusion die being connected to the forward ends of the individual ducts.

---

The invention relates to multiple extruding heads for extruders.

Extruders provided with multiple-extruding heads for the production of tubes and flexible tubes of any profile made of rubber, synthetic resin or other suitable material are known. Multiple extruding heads of this kind enable the simultaneous extrusion of two or more tubes or flexible tubes. The output capacity of existing extruders provided with multiple extruding heads of this kind may be considerably increased. The known multiple extruding heads have, however, the disadvantage that the different tubes or flexible tubes do not generally issue therefrom at exactly the same speed even when they have identical cross-sectional areas and identical profiles, so that their removal presents considerable difficulties. This is very disadvantageous in those cases where, as has recently become the general practice, tubes or flexible tubes issuing from the multiple extruding head are vulcanised, hardened or improved by a continuous thermal or chemical subsequent treatment directly after their discharge at a position a short distance beyond the extruder. In accordance with the invention, this serious disadvantage of the known multiple extruding heads may be avoided.

The invention relates to a multiple extruding head for extruders, in which a supporting member is mounted on the nozzle of the extruder. The supporting member contains two or more axially parallel ducts over which the effluent moulding composition from the nozzle of the extruder is distributed by a guide member, an outlet nozzle containing an extrusion die being connected to the forward ends of the individual ducts. In accordance with the invention, the individual discharge nozzles are provided with at least one device for controlling the flow of the moulding composition from the extruder.

The multiple-extruding head enables the rates at which various tubes or flexible tubes are discharged to be exactly controlled and adjusted to each other even when the tubes or flexible tubes have different cross-sectional areas and different profiles. Trouble upon removal and upon any subsequent treatment of the extruder tubes or flexible tubes in continuous operation resulting from the extruded rods or tubes issuing at different speeds can thus be safely avoided.

The drawings show respectively axial sections of three constructions of the multiple extruding head for extruders according to the invention and four modifications thereof or of part thereof, the extruding head in all constructions being assumed to be a triple extruding head.

FIG. 4 shows a second construction of multiple extruding head;

FIG. 5 shows a modification of discharge nozzle of the multiple extruding head illustrated in FIG. 4.

Figure 1:
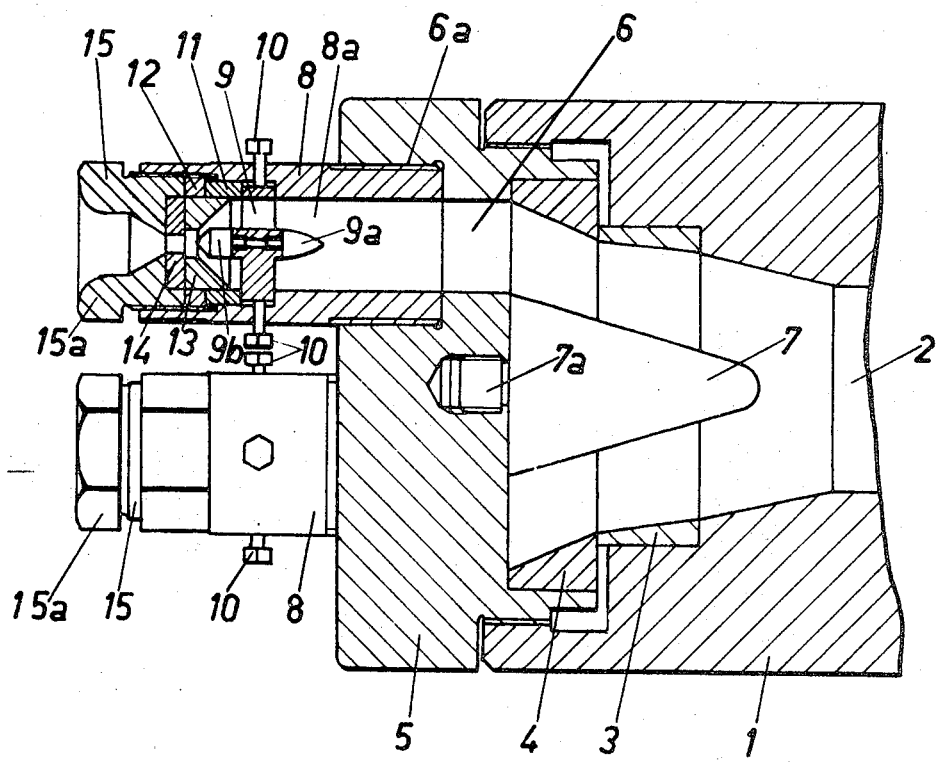
FIG. 1 shows a first construction of multiple extruding head.

In FIGS. 1 and 4, a nozzle 1 of an extruder, not shown, is provided with an axial bore 2 through which the moulding composition issues from the pressing cylinder. The outer part of the bore 2 is flared out conically, a spacer sleeve 3 provided with a conically flared out bore being inserted in the aforementioned widened part of the bore 2. A ring 4 provided with a conically flared-out bore and held by a supporting member for the discharge nozzles of the multiple extruding head rests against the periphery of the spacer sleeve 3, but the supporting member 5 being screwed into an internal thread provided in the outermost portion of the nozzle 1. The supporting member 5 contains a number of axially parallel ducts 6 of circular section corresponding to the number of discharge nozzles provided (three in the illustrated construction) at regular intervals in the form of a circle. The outer part of the ducts have a larger diameter and are respectively provided with an internal thread 6a. A guide member 7 of conical section in the illustrated construction, is secured coaxially to the supporting member 5 by means of a threaded lug 7a provided on its bottom surface and screwed into the axial thread provided in the inner surface of the supporting member 5. The moulding composition under pressure flowing from the extruder is uniformly distributed over the ducts 6 of the supporting member 5 by the guide member 7 extending through the ring 4 and the spacer sleeve 3 into the outer part of the bore 2. In all constructions of extruding head illustrated in FIGS. 1, 4, 6 and 7 the parts hereinbefore referred to are all of the same construction and will therefore not be described again in the following description of these constructions.

Screwed into the internal thread 6a of the individual ducts 6 in the supporting member 5 is a cylindrical nozzle body 8 whose bore 8a has a diameter corresponding to the diameter of the duct 6. The bore 8a of the nozzle body 8 is widened in the outer part of the body 8. A spoked wheel 9 provided with two or more spokes of streamlined section, so that the material passing through the gaps between them may meet the minimum resistance, rests against the shoulder thus formed in the nozzle body 8. Radially extending setting screws 10 screwed at regular intervals into peripheral threaded bores provided in the nozzle body 8 are provided for centering the spoked wheel 9 or for adjusting it in any other position when an irregular profile with irregularly distributed parts of the cross-sectional area makes it desirable. On the side turned towards the duct 6, a guide member 9a by which the inflowing moulding composition is displaced against the periphery of the bore 8a and guided into the spaces between the spokes of the spoked wheel 9, is screwed into the hub of the spoked wheel 9. A valve cone 9b is screwed coaxially into the hub of the spoked wheel 9 on the other side. On the discharge side, a spacer sleeve 11 inserted in the widened part of the bore 8a rests against the spoked wheel 9. A threaded ring 12 screwed into the internally threaded widened outer part of the bore 8a of the nozzle body 8 presses the spoked wheel 9 through the spacer sleeve 11 against the shoulder by which the widened part of the bore 8a of the nozzle body 8 is bounded. A bushing 13 the opening of which is conically flared out in the direction of the valve cone 9b and forms the valve seat, is axially displaceable in the spacer sleeve 11 and in the threaded ring 12. An extruding die 14 in the form of a circular disc which is held in a recess provided in the inner surface of a head piece 15 rests against the periphery of the bushing 13. The head piece 15 carries on its outer end a hexagon head 15a or a knurled or toothed head facilitating the screwing of the head piece 15 into and out of the internal thread of the outer part of the nozzle body 8.

The moulding composition under pressure flowing from the extruder through the bore 2 of the nozzle 1 is displaced outwardly and fed uniformly to the ducts 6 of the supporting member 5 by the guide member 7, partial currents flowing from the ducts 6 into the bores 8a of the nozzle body 8. The material flowing in the individual nozzle bodies 8 is guided by the guide member 9a against the peripheral surface of the bore 8a, passes through the gaps between the spokes of the spoked wheel 9 and is recombined downstream and pressed through the opening of the bushing 13 and through the extrusion die 14 to issue in the form of a tube, having a profile corresponding to the shape of the opening of the extrusion die from the head piece 15. The bushing 13 is pressed against the extrusion die 14 and thus pressed into the recess provided in the inner surface of the head piece 15 by the pressure of the inflowing moulding composition. The cross-sectional area of aperture between the valve cone 9b and the sleeve 13 and thus, at a given pressing power, the speed at which the extruded tube is discharged from the extrusion die and from the head piece may be varied, so that the rates at which the extruded tubes are discharged from all of the discharge nozzles of the multiple extruding head may be exactly adjusted to each other, that is to say equalised. This control of the rate at which the tubes issue from the available discharge nozzles can also be effected when tubes of different cross-sectional shapes and/or different cross-sectional areas are extruded.

Figure 2:
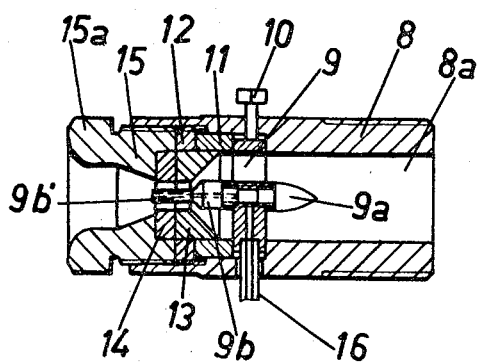
FIG. 2 shows a first modification of discharge nozzle of the multiple extruding head illustrated in FIG. 1.

The modification of discharge nozzle illustrated in FIG. 2 which corresponds substantially to the discharge nozzle of the multiple extruding head illustrated in FIG. 1 is used for the extrusion of flexible tubes. In this discharge nozzle, one of the spokes of the spoked wheel 9 contains an air duct 9c, one of the setting screws 10 for the spoked wheel being replaced by a compressed-air duct 16 which is introduced through an opening provided in the wall of the nozzle body 8 and connected to the air duct 16. The valve cone 9b has an axial cylindrical extension 9b' which extends through the opening of the bushing 13 and the opening of the die 14. An axial continuous air duct provided in the valve cone 9b and its extension 9b' is in communication with the air duct 9c and thus with the compressed-air duct 16. The moulding composition is pressed all around the extension 9b' of the valve cone 9b through the opening of the die 14 and thus forms a flexible tube which immediately upon sliding off the extension 9b' is filled with compressed air and thus inflated. The rate at which the extruded flexible tube issues from the die 14 and from the head piece 15, 15a is controlled as hereinbefore described.

Figure 3:
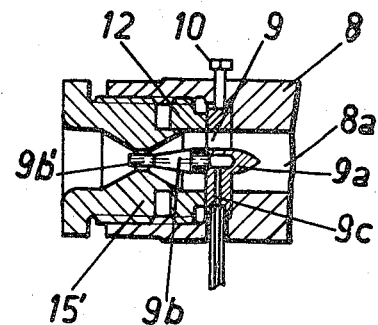
FIG. 3 is a second modification of discharge nozzle of the multiple extruding head illustrated in FIG. 1.

The modification of discharge nozzle illustrated in FIG. 3 which is also intended for the extrusion of flexible tubes, is distinguished from the discharge nozzle illustrated in FIG. 2 mainly by its head piece 15' which simultaneously constitutes the die and the part forming the valve seat.

In the construction of multiple extruding head illustrated in FIG. 4, the base of the portion of greater outer diameter of the individual ducts 6 in the supporting member is provided with a groove in which a spoked wheel 20 of the construction hereinbefore described is inserted, and held in position by an externally threaded ring 21 screwed into the outer part of larger diameter of the duct 6 provided with a corresponding internal thread. Also screwed into the internally threaded outer part of larger diameter of the duct 6 is a nozzle body 22 the rear end of which is provided with a corresponding external thread. The internal end of the nozzle body 22 is provided with a cylindrical lug 22b which engages in the threaded ring 21 snugly contacting it. On the side turned towards the extruder the hub of the spoked wheel 20 forms a guide member 20a, a coaxial valve cone 20b being screwed to it on the other side. The internally threaded outer portion of the bore 22a of the nozzle body 22 has a larger diameter than the part turned towards the extruder. Provided at the base of the outer, wider part of the bore 22a is a groove in which a ring 3 is inserted, the bore of the ring having exactly the same diameter as the narrower portion of the bore 22a of the nozzle body 22. The ring 23 is held by an externally threaded ring 24 which is screwed into the internally threaded part of larger diameter of the bore 22a of the nozzle body 22. A head piece 25 the outer end of which is provided with a hexagon head 25a is screwed into the internal thread of the nozzle body 22. The head piece 25 is provided with an axial bore, the cylindrical internal part 25b of which terminates in a shoulder, its outer part 25c being conically flared out. The extrusion die 26 rests against the shoulder bounding the internal part 25b of the bore, a bushing 27 resting against the extrusion die 26. The bushing 27 is provided with a bore of decreasing diameter in the direction of the extrusion die 26.

The operation of the discharge nozzle illustrated in FIG. 4 corresponds substantially to that of the discharge nozzle illustrated in FIG. 1, except that the flow of material instead of being controlled at the forward part of the discharge nozzle by screwing the head piece thereof, is controlled at the rear end of the discharge nozzle by screwing the nozzle body 22 in the internal thread of the front part of the dut 6 of the supporting member 5 with resultant variation of the cross-sectional area of aperture between the valve cone 20b and the lug 22b of the nozzle body 22.

The modified construction of the discharge nozzle illustrated in FIG. 5 for the multiple extruding head illustrated in FIG. 4, of which only the front part is shown, is used for the extrusion of flexible tubes. In the discharge nozzle illustrated in FIG. 5, the ring 23 is replaced by a spoked wheel 28 which is inserted with play in a groove provided in the outer, widened part of the bore 22a of the nozzle body 22, in which it is centered or adjusted in any other position by means of setting screws 29, as in the discharge nozzle illustrated in FIG. 2. The spoked wheel 28 is held axially by a threaded ring 24 screwed into the internal thread of the outer, wider part of the bore 22a of the nozzle body 22. A guide body 28a is screwed into the hub of the spoked wheel 28 on the side turned towards the extruder, a valve cone 28b with a cylindrical extension 28b' being screwed into the hub on the opposite side. As in the discharge nozzle shown in FIG. 2, one of the spokes of the spoked wheel 28 is provided with an air duct 28c to which a compressed air line 30 introduced through a radial opening provided in the wall of the nozzle body 22 is connected, the valve cone 28b and the extension 28b' thereof being provided with an axial air duct. The operation of this discharge nozzle corresponds to that of the discharge nozzle illustrated in FIG. 2; it affords, however, the advantage of affording two-fold control, that is to say by screwing the nozzle body 22 in the supporting member 5 and by screwing the head piece 25 in the nozzle body 22 with resultant improved controllability and increased range of control.

In all constructions dead spaces in which moulding composition may settle in the ducts through which the moulding composition flows, should, if possible, be avoided.

What is claimed is:

1. In a multiple extruding die for extruders comprising a mouth piece or nozzle and a supporting member mounted thereon having two or more axially parallel ducts through which the moulding composition flowing from the nozzle of the extruder is distributed, the improvements comprising means to individually vary the discharge through each of said parallel ducts including a discharge nozzle mounted at the exit of each said parallel duct and having a die member carried thereby, each said discharge nozzle comprising therewithin and upstream from said die a spoked wheel having a hub which carries a guide member for the inflowing moulding composition on the inlet side thereof, a valve cone on the outlet side of said spoked wheel, and an annular member carried within each said discharge nozzle downstream from said valve cone to cooperate therewith and define therewith a conical valve, said conical valve being upstream from said die and defining the minimum cross-sectional area through which said moulding composition must travel in its path, said die being rotatably supported in said discharge member, and said conical valve being adjustable by the rotary motion of said die support.

2. A device in accordance with claim 1 wherein said annular member comprises a bushing having a conical bore located immediately upstream from said extrusion die and axially adjustable together therewith, the conical bore of said bushing decreasing in diameter in the direction of the extrusion die and forming the valve seat.

3. A multiple extruding head according to claim 1, wherein said spoked wheel is mounted with radial play in a groove provided in said nozzle and is adjustable in a central or other position by a setting screw screwed into the wall of said nozzle.

4. A multiple extruding head according to claim 1, for the extrusion of flexible tubes, in which one of the spokes of the spoked wheel is provided with an air duct to which a compressed air line introduced through an opening provided in the wall of the nozzle body is connected, the valve cone possessing a cylindrical extension passing freely through the opening of the extrusion die and a continuous axial air duct connected to the first air duct provided in one of the spokes of the spoked wheel.

5. A multiple extruding head according to claim 1, in which the individual discharge nozzles are provided with two devices constructed in the manner of conical valves for controlling the flow of the moulding composition, one of the devices being adjustable by screwing a head piece in the forward end of the nozzle body, the other being adjustable by screwing the nozzle body in the supporting member.

References Cited

UNITED STATES PATENTS

| | | | |
|---|---|---|---|
| 1,768,790 | 7/1930 | Royle | 18—12DM |
| 2,624,914 | 1/1953 | Rhodes | 18—12DMX |
| 3,281,896 | 11/1966 | Meyer et al. | 18—14V |
| 3,339,235 | 9/1967 | Nossol | 18—14V |
| 3,357,050 | 12/1967 | Crisa | 18—14V |
| 3,416,190 | 12/1968 | Mehnert | 18—12DMUX |

J. SPENCER OVERHOLSER, Primary Examiner

R. S. ANNEAR, Assistant Examiner